United States Patent [19]
Day

[11] 3,938,139
[45] Feb. 10, 1976

[54] MINIATURE DISPLAY COMMUNICATOR

[75] Inventor: Leslie R. Day, Wyckoff, N.J.

[73] Assignee: Young Communications Corporation, Larchmont, N.Y.

[22] Filed: Dec. 30, 1974

[21] Appl. No.: 537,071

[52] U.S. Cl. .............. 340/324 R; 35/35 B; 340/339
[51] Int. Cl.² ......................................... G06F 3/14
[58] Field of Search ........ 340/339, 334, 337, 324 R, 340/324 M; 178/17 A, 17 B; 35/35 B, 6, 71

[56] References Cited
UNITED STATES PATENTS

| | | | |
|---|---|---|---|
| 3,493,956 | 2/1970 | Andrews et al. .................... | 340/339 |
| 3,493,957 | 2/1970 | Brooks ............................... | 340/339 |
| 3,750,138 | 7/1973 | Burgan et al. ...................... | 340/339 |
| 3,878,327 | 4/1975 | Uhler ................................. | 35/35 B |

Primary Examiner—Marshall M. Curtis
Attorney, Agent, or Firm—Ostrolenk, Faber, Gerb & Soffen

[57] ABSTRACT

A miniature, hand-held device for displaying text information in a moving format in a word sequential manner. Text material is inputted by means of magnetic tape and displayed at an operator selectable rate. A "super speed" format is adapted to display words in a parallel by character-sequential by word fashion. All of the characters of a word are simultaneously displayed only after the displayed word has its first letter aligned with a fixed index mark of the display which tends to eliminate the need for eye movement (saccades). A word time expansion control is selectable to increase the viewing time for each word in proportion to word length. An automatic brightness control is provided for increasing display brightness for words whose display time interval is less than a predetermined time period.

In an alternative embodiment, means are provided for increasing the blanking time after words longer than a predetermined number of characters as a function of the total number of characters in a long word before displaying the next word of the text material.

4 Claims, 8 Drawing Figures

FIG. 5.

MINIATURE DISPLAY COMMUNICATOR

The present invention relates to display devices and more particularly to portable hand-held devices for displaying text material in a single line fashion at operator selectable display rates wherein the time interval of display of a word or the time interval of blank periods between succeeding words are automatically controlled as a function of word length.

BACKGROUND OF THE INVENTION

A most economical approach for displaying text information is the printed page such as, for example, books, magazines, newspapers and the like. The drawbacks of the printed page format resides in the fact that lines of text appearing both above and below the line being read serves as a distraction to the reader. In addition thereto, the printed text plays a passive role in the sense that reading speed is controlled exclusively by the reader and the text exerts no influence whatsoever upon the reading rate. Tracking of content depends upon the reader's mood and eye agility. Retention, the bane of speed reading, depends on interest levels and degree of intelligence of the reader.

BRIEF DESCRIPTION OF THE INVENTION

The present invention is characterized by providing a display and display format adapted to exert an active influence upon the reader by providing operator selectable display rates enabling the operator to choose a comfortable reading speed, if desired or alternatively to enable the operator to select more challenging display rates to thereby foster significant improvement in reading skills.

The present invention, in one preferred embodiment, comprises means for receiving a portable data storage assembly such as, for example, a magnetic tape cassette having stored therein, preferably in binary form, the textual information to be displayed.

Data is transferred into a tape buffer memory, one block at a time. The loading of a block of data initiates its transfer from the process memory, at a significantly higher rate thereby releasing the tape buffer memory for receipt of the next block of textual information. Subsequent data transfer continues in this manner.

The block of data transferred to the process memory is advanced one character at a time to a dot matrix pattern generator which converts the binary coded word into a 10 row by 7 column dot matrix pattern wherein each 10 dot column is shifted into a 10 row by 1750 column matrix of light emitting diodes (LEDS). As each 10 dot column is loaded into the left-hand end of the display, the previous column loaded therein is shifted one column position to the left.

None of the columns comprising a character are illuminated until an entire word is shifted into the display, at which time all of the dot columns representing the characters of that word are simultaneously illuminated.

When operating in the word time expansion control mode, it is possible to expand the display time of any word whose word length is greater than four characters with the display expansion time being a function of the number of characters in excess of four. Thus, each word being displayed has its first or left-hand-most character aligned with the index mark with the remaining characters positioned to the right thereof. The word is displayed in this position for a time period which is a function of word length thereby enabling longer words to be observed for correspondingly longer periods of time which serves to enhance both reading speed and comprehension.

In an alternative embodiment, whereas display time remains constant regardless of word length, blanking time after long words is made correspondingly longer with the length of blanking time being a function of the length of the previously displayed "long" word.

Automatic brightness control is provided to increase the brightness of the display where short words, i.e. words whose display time is less than a predetermined threshhold, to provide compensation for words of short time display intervals by increasing the brightness of the display so as to maintain a substantially constant "apparent" brightness for all words displayed regardless of their display time.

BRIEF DESCRIPTION OF THE FIGURES AND OBJECTS OF THE INVENTION

It is therefore one object of the present invention to provide a novel hand-held device for the display of textual information and which serves as an active influence upon both reading speed and reading comprehension.

Still another object of the present invention is to provide a device of the type described in which the display rate is operator selectable.

Still another object of the present invention is to provide a novel hand-held device of the type described in which the display time of a word is a function of word length.

Still another object of the present invention is to provide a device of the type described in which the blanking time between adjacent displayed words is a function of the length of the first such word displayed.

Still another object of the present invention is to provide a device of the type described in which the brightness of words whose display time intervals are brief is increased in magnitude as an inverse function of display time to maintain a substantially constant apparent display brightness for all words.

The above as well as other objects of the present invention will become apparent when reading the accompanying description and drawings in which.

DETAILED DESCRIPTION OF THE INVENTION

Figure 1:
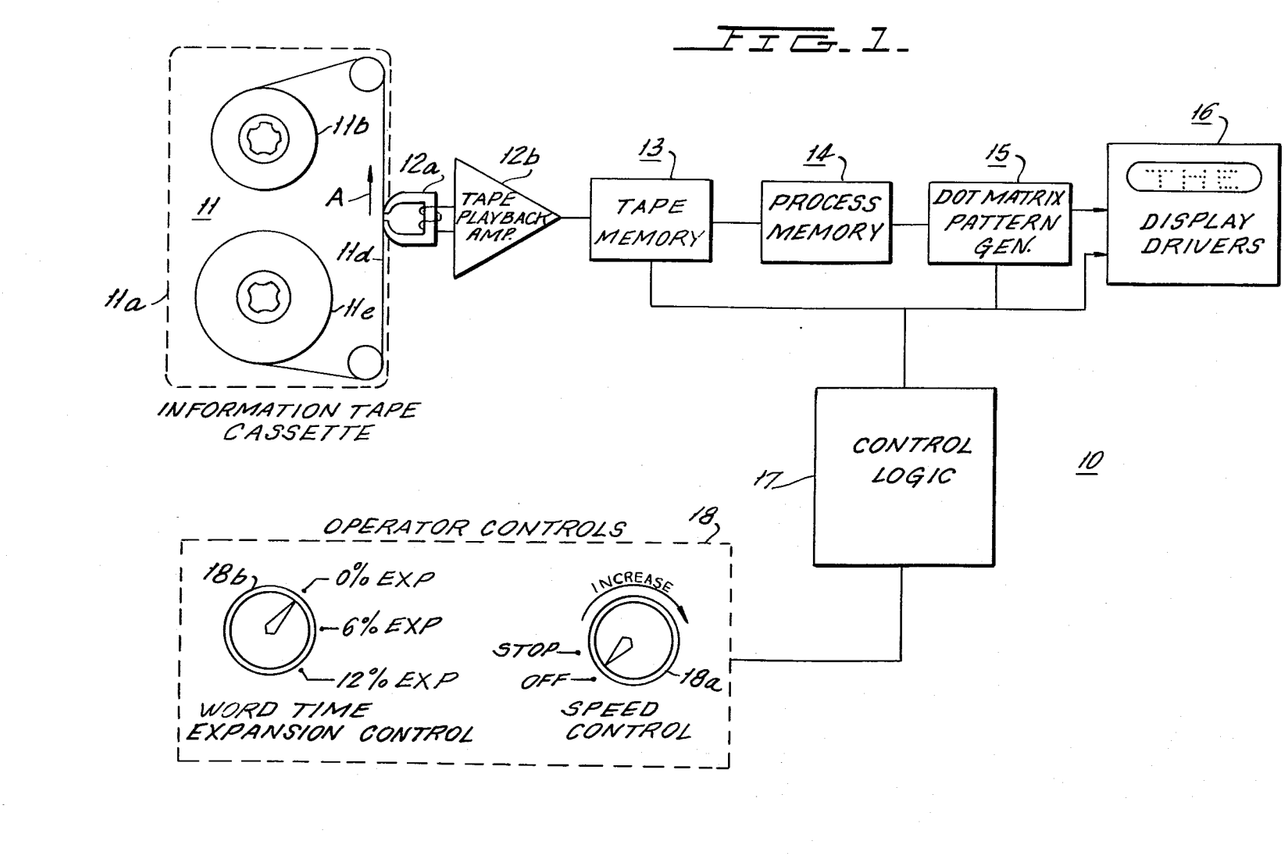
FIG. 1 shows a simplified block diagram of a display communicator embodying the principles of the present invention.

The electronic communications device 10 shown in FIG. 1 provides a new and improved technique for displaying text information which serves as an alternative (and superior) means for displaying such information normally displayed in a printed page format (e.g. books, newspapers, magazines etc.) wherein the device of the present invention serves in an active manner to increase both reading speed and comprehension and to decrease eye fatigue. The communicator device is a portable, compact, hand-held, solid state unit which, due to its significantly reduced weight and size can be held and manipulated in much the same manner as present day hand-held electronic solid state calculators.

One major aspect of the invention resides in the electronic visual display panel 16 which is capable of displaying, in one preferred embodiment, up to 25 alphanumeric characters in a single line format. A magnetic tape drive system 11a (not shown for purposes of simplicity) together with buffer memory registers and control logic provides the information storage source as well as the needs for transferring alphanumeric text information to visual display panel 16 for viewing by the operator.

Figure 2:
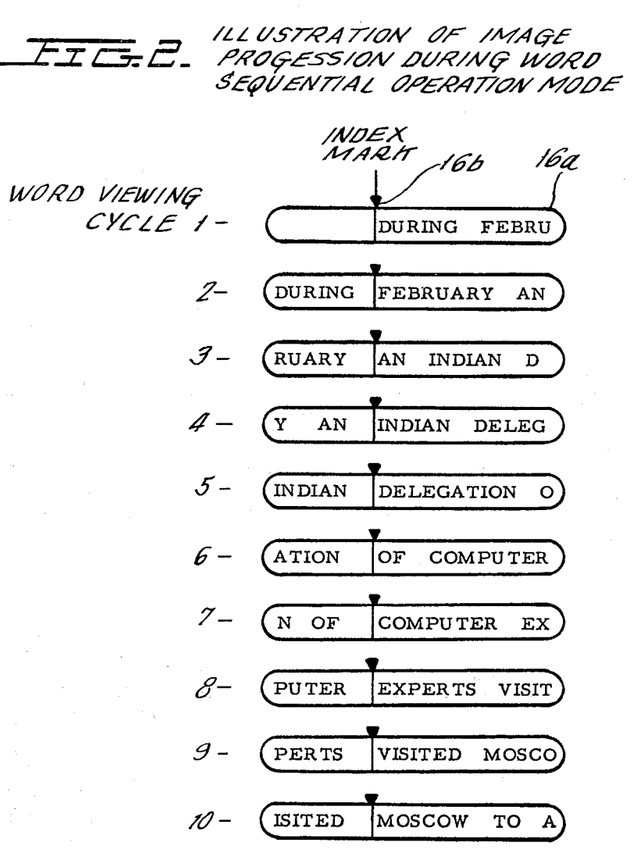
FIG. 2 shows a graphic illustration of progression during word sequential mode of the communicator of FIG. 1.

Text information is displayed in a word sequential manner, shown best by the illustration of FIG. 2. Text information is displayed on the single line display by entering characters at the right-hand end of the viewing screen 16a in a dot column by dot column fashion. Each character is entered in the right-hand-most display position and is then shifted to the left as new characters are entered. The characters are formed by a dot matrix comprised of 10 dot rows and 7 dot columns, up to a maximum of 70 dot positions which are selectively energized to create either alphabetic or numeric characters, punctuation marks and the like. The dot patterns are shifted right to left in dot column increments. The shifting of the dot columns into the display does not effect the viewer's ability to read the word as it progresses across the display screen. The rate of progression is operator selectable by means of manipulation of the speed control knob 18a.

The communicator, in the first mode of operation, moves the words across the display, at an operator selected speed which may be one that provides a reasonably relaxed reading rate, or alternatively, may be one that challenges the reader to develop a faster reading rate.

In word sequential mode, the communicator transfers dot patterns to the display in a non-illuminated fashion so that the entire word being inputted is not illuminated until all characters of the word have been transferred to the display and the first (i.e. left-handmost) character thereof has been advanced to the index mark 16b. The words remains illuminated in this stationary position for a time interval which is a function of word length. Succeeding words of the text are inputted in a similar fashion. In a modification of this embodiment, words may be displayed at a constant display interval upon reaching the index mark and the blank time between the word presently at the index mark and the next word to be inputted into the display is controlled so as to be a function of the word length for the word presently at the index mark. The fixed starting location of the key word in each image frame tends to eliminate the need for eye movement (saccades) so as to reduce eye fatigue while providing a display of sufficient length from its simultaneous viewing of the preceeding and following words thereby increasing comprehension speed by providing recognition clues for the key word. The single display has the further added advantage of eliminating any distraction caused by printed text which would otherwise be presented both above and below the line being read. All of these advantages tend to increase the viewer's reading speed in terms of comprehension and retention when compared to page format reading.

Operation of the display communicator is initiated by loading a prerecorded tape cassette 11 (FIG. 1) containing text information and key words, into the tape drive receptacle 11a. The display is activated by moving the speed control knob 18a to a setting representing a text display rate compatible with the reading rate of the operator. The unit may also be halted whenever desired to permit fixed viewing by manipulation of the speed control knob to the STOP position.

Transfer of text information from the magnetic tape cassette 11 to display 16 is controlled by the control logic unit 17 and the operator control panel 18. Assuming that a tape cassette has been loaded into the tape drive receptacle 11a which, although not shown for purposes of simplicity, is understood to have means for appropriately rotating tape spools 11b and 11c to cause the magnetic tape 11d to move, for example, in a first direction as shown by arrow A, enabling pickup of the magnetic patterns representative of binary information and synchronized pulses by means of pickup head 12a. The signals are amplified by the tape playback amplifier 12b to transfer the first information block (preferably comprised of 576 characters) into tape memory 13. Logic control unit 17 senses the transfer of a block of information by sensing the presence of an EOB (end-of-block) code to halt the tape movement until the next information block is required. The information block in tape memory is then transferred to the process memory 14 at a higher transfer rate than that between the magnetic tape input 11d and tape memory 13. Upon completion of transfer of this block of information into process memory 14, the tape drive is reinitiated to transfer the next information block into tape memory 13. This pattern is repeated for succeeding information blocks.

The information block moved from tape memory 13 to process memory 14 is processed by the dot pattern generator circuit 15 to convert the binary coded representation of each character into a dot matrix pattern. Each binary word applied to the dot pattern generator 15 causes each dot column of the pattern to be transferred into the display in a dot column by dot column fashion until the entire dot pattern for the character has been transferred into the display at which time the binary word for the next character to be displayed is applied to the dot pattern generator 15.

Display unit 16 remains blank during the time when characters are being shifted into the display. When the word has been loaded in to the display and the first character of the first word has been shifted into the index position of the display, the word process action terminates and the display unit is illuminated to display the first word for a specified display time, which time is controlled by the operator's speed control.

At the end of the display time, the next word is processed through the dot pattern generator in the same manner as that described hereinabove. Thus, all of the words in the information block contained in the process memory are processed and displayed after which time the control unit causes the information block now in tape memory to be transferred to process membory at which time the next information block is moved from magnetic tape 11d to tape memory 13. This action continues until the end of the tape is sensed or until the operator sets the speed control to STOP or OFF. The speed at which characters are transferred from process memory 14 to dot pattern generator 15 and displayed is determined by the speed control setting of control knob 18a.

WORD TIME EXPANSION CONTROL

A salient feature of the word sequential mode permits the operator, through the use of the word time expansion control, to increase viewing cycle time for each word in proportion to word length.

It is a well established fact that additional time is required to read and comprehend words as word length increases. The word time expansion control allows an operator to activate circuitry which automatically increases the time period of the viewing cycle of each word transferred to the display in proportion to word length. Longer words have a longer view cycle time period. The word time expansion control, shown at 18b in FIG. 1, can, in one preferred embodiment, be set to 0, 6% or 12% increase in viewing time per number of letters in a word over a base number of four letters. Words having up to four letters are not increased in viewing cycle time at all and their viewing cycle time is dependent entirely upon the speed control setting.

If the word time expansion control is set to the 6% increase position, the fixed view time is increased by 6% for each letter over four in the word. For example, a 6% increase for a six letter word would have a total view time of 112% relative to the view time of a four letter word. An 11 letter word would have a view time of 142% relative to the base time (i.e. to the 1–4 letter word view time). If the word time control is increased to a 12% setting, six and 11 letter words would increase to 124% and 184% of the base time,, respectively.

The base time is always determined by the speed control. Thus, the operator can adjust the view time for the shorter words with the speed control and further adjust the desired increase in viewing cycle time for longer words with the word time control.

DISPLAY PANEL

The visual display device 16 (note also FIG. 4) is capable of displaying up to 25 alphanumeric characters in the single line format. The display device comprises LED's arranged in a 10 × 175 matrix with individual characters being formed by 10 × 7 elements per group.

Each of the 1750 LED's can be activated independently of one another. The selection and activation of LED display elements is accomplished by thin film circuitry which is preferably monolithically fabricated on the same substrate which is utilized for the display matrix and in a configuration which is coplanar with the display elements. Thus, the visual display and its associated selection and drive activation circuits may be monolithically fabricated upon a single chip. The preferred dimensions of the display device for use in the miniature display communicator of the present invention are such that the individual elements are preferably 0.20 inches arranged on 0.030 inch centers. Thus, the overall dimensions of the matrix display face are 0.330 × 5.2530 inches.

LOGIC OPERATION

Figure 3:
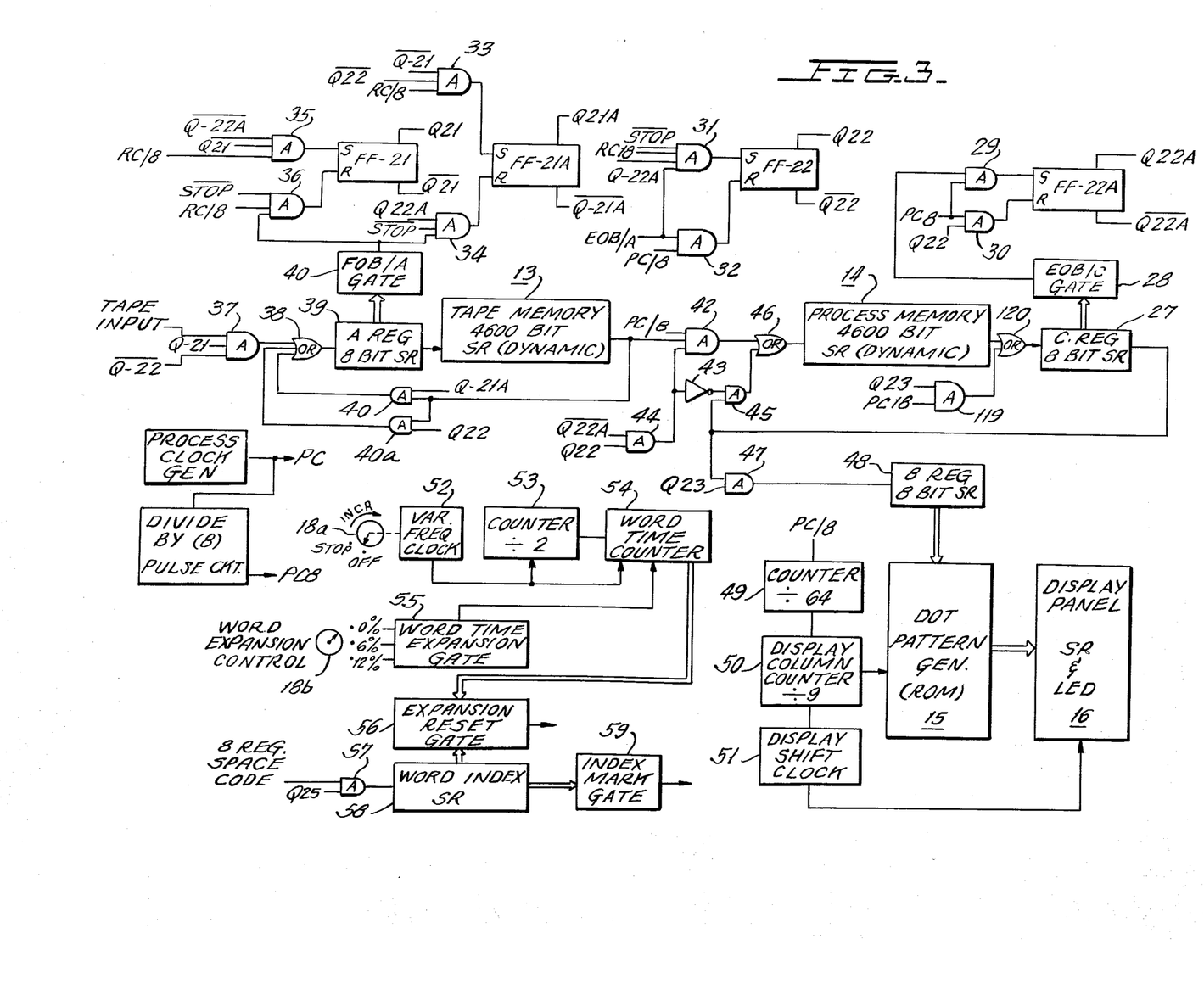
FIG. 3 is a block diagram showing progressions of the display communicator of FIG. 1 in greater detail.

FIG. 3 shows the overall information flow and control logic for the miniature display communicator 10. Flip-flop 21 controls the tape to tape memory transfer while fip-flop 21A controls the regeneration of the data stored in the tape memory. Both the tape memory and process memory employ solid state dynamic shift registers. Flip-flops 22 and 22A control the transfer of information blocks from tape memory to process memory.

Alphanumeric text information is stored in magnetic tape cassettes. The alphanumeric characters are stored in blocks of 576 characters or bytes (bytes consist of seven information bits plus a low order parity/control bit, making a total of eight bits per character or byte). The last character in each information block is a special character designated EOB which signals the end of block.

When the last information character has been processed in the process memory, an EOB character will be sensed in the C-register 27 which causes a high signal to be generated by gate 28 which detects the presence of the byte representing the end of block condition. The output of gate 28 at PC/8 time, enables gate 29 to set flip-flop 22A causing its Q and Q outputs to go high and low, respectively. The Q output, in turn, enables gate 31 during PC/8 time, when the communicator is not in the STOP mode (see inverter 61 in FIG. 5); and when the next EOB/A gate signal goes high thus setting the Q and Q outputs of flip-flop 22 at high and low, respectively. The EOB/A signal developed by gate 40 allows the information block being regenerated in tape memory 13 to be correctly positioned timewise for transfer to the process memory. The output of gate 40 goes high when the first character of the tape memory information is ready for transfer. Flip-flop 22 is thus set by gate 40 causing flip-flop 22A to be reset. Gate 40 also resets flip-flop 21A which stops the regeneration of tape memory 13 which, as was described hereinabove, is a solid state dynamic shift register having 4600 stages with each stage capable of storing one binary bit. With flip-flop 22 set and flip-flop 22A reset, the gate 44 is enabled to allow the contents of gate memory 13 to be passed through gate 42 during a PC/8 time. The signal PC/8 undergoes a logical AND operation by gate 42 with the Q and Q outputs of flip-flop 22 and flip-flop 22A, respectively, to force all of the parity control bits residing in tape memory 13 as they are applied to gate 42 to the zero condition. The PC/8 signal is a clock pulse derived from the Divide By 8 pulse circuit which is driven by the PC clock pulse from the Process Clock Pulse Generator (2.5 megahertz). See FIG. 3. The PC/8 bit occurs in coincidence with the appearance of each parity control bit at the output of tape memory 13. The purpose for forcing all parity control bits to the binary zero state during transfer from tape memory 13 to process memory 14 will be explained in more detail hereinbelow.

Upon completion of transfer of data from tape memory 13 to process memory 14 the end of block character EOB will reside in A register 39 to enable gate 40. This output condition is applied to gate 32 to reset flip-flop 22 during PC/8 time, thus completing the transfer step.

With regard to transfer from tape drive 11a to tape memory 13, flip-flop 21 will be set when flip-flop 22A is reset at the beginning of the transfer operation from tape memory to process memory. This occurs when the Q output of flip-flop 22A goes high, which condition is applied to one input of gate 35, the other inputs receiving the Q-output of flip-flop 21 and the clock pulse at PC/8 time. The tape drive is activated by having flip-flop 21 in the set condition (Q) and flip-flop 22 in the reset condition (Q) thus, the tape drive will start when flip-flop 22 is reset at the end of the transfer of data from tape memory 13 to process memory 14. A completion of the transfer of an information block from magnetic tape to tape memory will be indicated when the end of block signal appears in register 39 causing gate 40 to be enabled and thereby resetting flip-flop 21. Flip-flop 21 is reset to cause flip-flop 21A to be set which starts the regeneration of tape memory. The resetting of flip-flop 21 causes a high level at the Q output enabling gate 33 to set flip-flop 21A.

Figure 4:
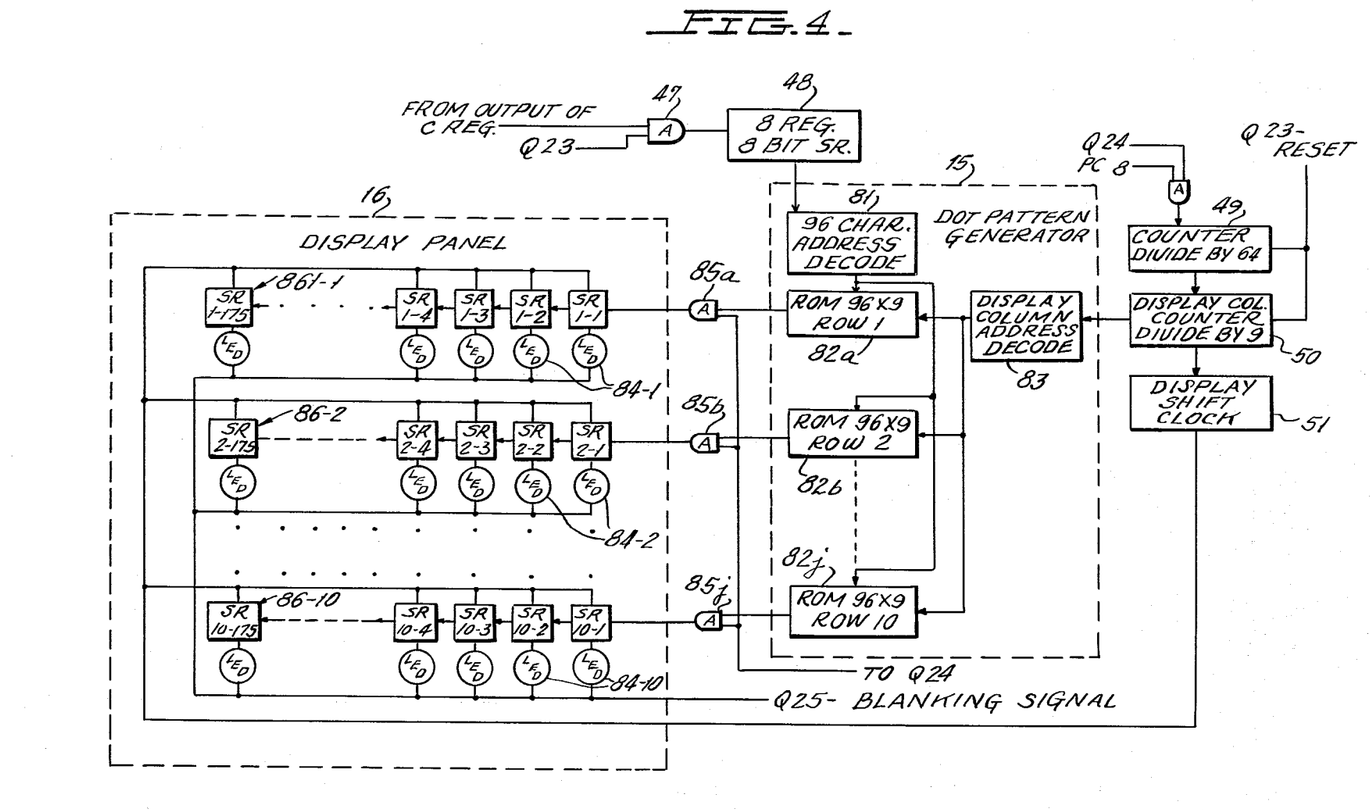
FIG. 4 is a block diagram showing the pattern generator and display panel of the communicator of FIGS. 1 and 3 in greater detail.
Figure 6:
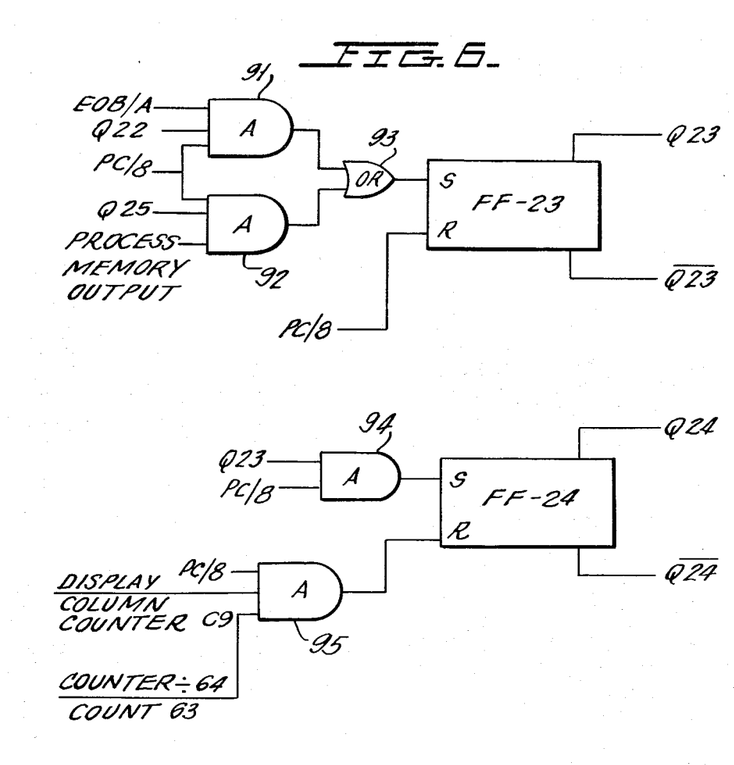
FIGS. 6 and 7 are block diagrams showing gating circuitry for controlling the display and word expansion circuitry of FIGS. 4 and 5.
Figure 7:
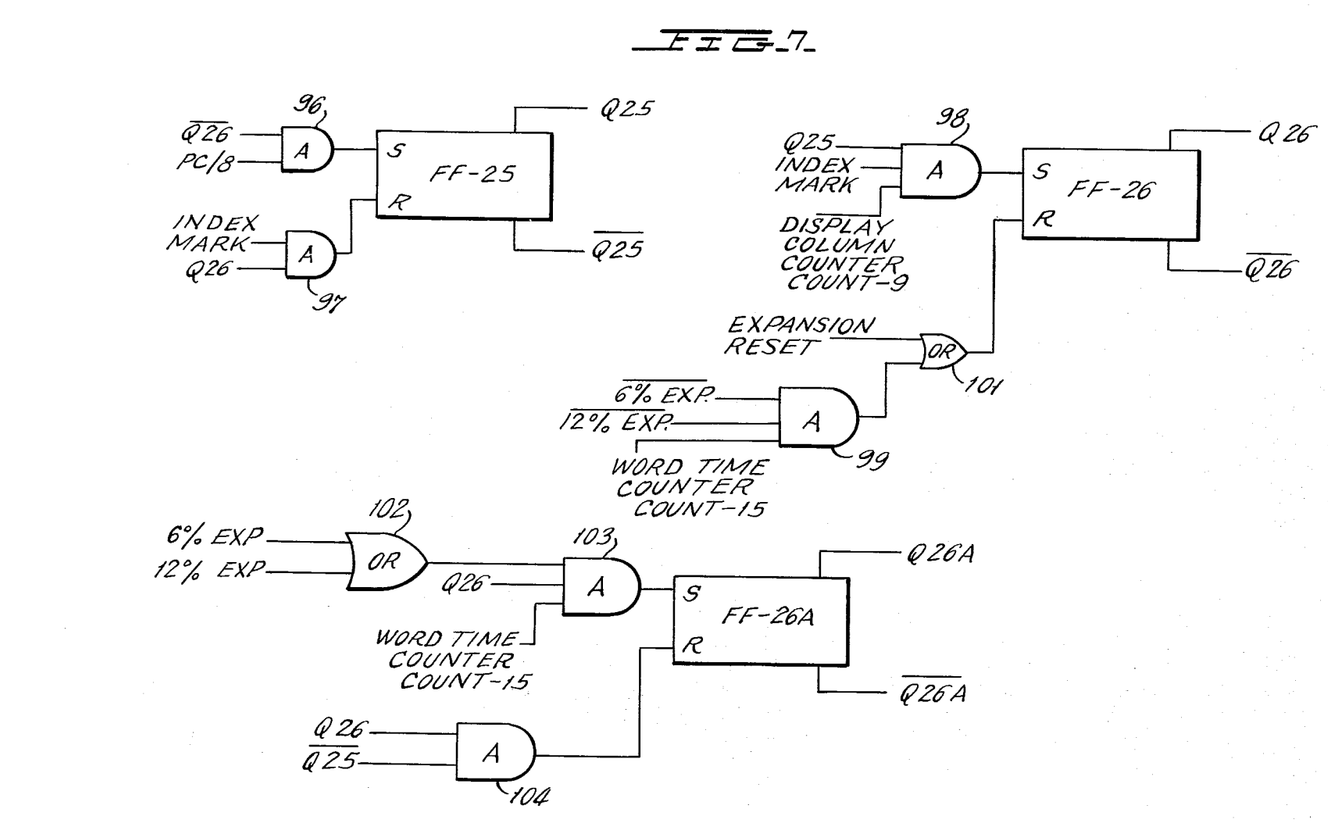

The operation transferring characters from process memory 14 to display 16 is controlled by flip-flops 23 and 24, shown in FIG. 6, and flip-flops 25, 26 and 26A, shown in FIG. 7, which should further be considered in conjunction with FIGS. 3 and 4.

Flip-flop 23 provides a 1-byte time gate for the transfer to the B-register 48 (see both FIGS. 3 and 4) of the next character to be processed. Flip-flop 24 defines the actual period during which a character is converted into its corresponding dot matrix pattern and its subsequent transfer to the display unit. Flip-flop 26 defines the fixed time display period and flip-flop 26A controls the added display time for the words which are subject to word time expansion.

Flip-flop 23 provides a 1-byte time gate for transferring the next character to be processed from the process memory 13 to the B-register 48. Flip-flop 23 is set either by the enablement of gate 40 (indicating an end of block word in register 39) and the setting of flip-flop 22 at the end of transfer from tape memory to process memory causing gate 91 to be enabled, which state is passed by OR gate 93 to set flip-flop 23. Alternatively, flip-flop 23 may be set by the setting of flip-flop 25 and the presence of the parity control bit in C-register 27 causing gate 92 to be enabled and resulting in a coupling of this state through OR gate 93 to the set input of flip-flop 23. The parity control bit of the next character is forced to a one-bit at the end of the current flip-flop 23 time period. This is caused by gate 119 forcing the output of the process memory to a 1 bit through OR gate 120 at PC/8 bit time during the one byte flip-flop 23 time period. Thus the parity control bit is forced high as it is transferred from the process memory to the C register. In this manner, the next character to be processed is indicated by a high parity control bit. Gate 92 causes flip-flop 23 to be set when the next high parity control bit is sensed at the output of the process memory at PC/8 time during the flip-flop 25 set condition (Q). For this reason, all parity control bits are force low (binary zero) at the time of transfer from tape memory 13 to process memory 14. Flip-flop 25, when high, defines the period during which characters are processed from the process memory to the dot pattern generator. Flip-flop 25 is set high (Q) by gate 96 at the next PC/8 clock pulse which occurs after flip-flop 26 is reset (Q) at the end of the display period. Flip-flop 25 is reset low by gate 97 (FIG. 7) when the Index Mark signal goes high indicating that the first character of the next word has been shifted to the Index Mark (see FIG. 2).

FIG. 4 shows the process logic for converting each byte into the corresponding dot patterns for display. Process memory 14 is comprised of a multistage solid state dynamic shift register equal in number to the number of stages of tape memory 13 and requires the data to be fed back to the input of process memory 14 to register 27 in gate 45 in a closed loop fashion in the same manner as is provided for tape memory 13 (through either gate 40 or 40a). The process of converting each character to its corresponding dot matrix pattern is timed to coincide with one complete data circulation in the process memory loop (i.e. 576 byte times). Flip-flop 24 is set by gate 94 upon the occurrence of the flip-flop 23 byte time period and is reset by count 63 of the divide by 64 counter 49 (see FIGS. 3 and 4) and count 9 of the display column counter which is a divide by 9 counter 50. Thus, during PC/8 time flip-flop 24 is reset, the combination of the count of 63 and the count of 9 defining the end of the dot pattern conversion process for one block of information.

The dot pattern generators consist primarily of 10 read only memory units (ROM's) 82a–82j. Each of the ROM's is associated with one shift register row 86-1 through 86-10 of the display 16. The appropriate digital information representative of the dot matrix pattern is stored permanently in each ROM such that each individual byte transferred to register 48 serves to address a specific set of memory cells. The character code is thus utilized as part of the ROM address and is applied to the address decoding circuit 81 which activates the appropriate ROM 82a – 82j. The display column counter 50 serves as the remainder of the ROM address in order to generate each specific dot column pattern in a dot column by dot column sequential manner for each specific character. The byte in register 48 is retained in this register for the entire process time of the character represented by that byte as controlled by flip-flop 24. The display column counter generates nine successive column codes for each character and its output is applied through address decoder 83 to the appropriate ROM 82a–82j. It should be noted that each two adjacent alphanumeric characters are comprised of seven dot columns and an additional two blank columns which are automatically generated to separate each character from the next. It can be seen that the divide by 64 counter 49 and the display column counter (divide by 9 counter) 50 will count 576 PC/8 pulses which corresponds to the 576 bytes circulating in the process memory and thus causing the processing of each character to correspond with one process memory loop time, it being understood that an information block consists of 576 bytes or characters. The process of generating characters continues until an index mark gate 78 (see FIG. 5), to be more fully described, goes high to indicate that the next word has been shifted to the word index mark 16B (see FIG. 2). This signal is applied to gate 98 of FIG. 7 to set flip-flop 26 when flip-flop 25 has been set and when the display column counter 50 develops a count of 9 condition. The high condition at the Q output of flip-flop 26 is applied to gate 97 to reset flip-flop 25 and to thereby reset the current word processing cycle. Flip-flop 26 remains set for a time period defined by the variable frequency oscillator 52 (note, for example, FIG. 3) which is controlled by the operator's speed control knob 18b, shown in FIGS. 1 and 5 and by the word time counter 54. The base word (containing 1–4 characters) time is provided by allowing the word time counter 54 to count 16 output pulses applied thereto by the variable frequency clock 52. If the word time expansion control is moved to either the 6% or 12% setting, the word time counter will start a second count of 16 with each count being compared with its corresponding stage of the word index shift register 73, shown in FIG. 5. The second count will be terminated when the output of the expansion reset gate 56 (see FIG. 3) goes high. In the first case, flip-flop 26 will be reset at count 15 of the word time counter (for a 0% word time expansion) and in the second case, flip-flop 26 will be reset by the expansion reset gate signal. Thus, when in the 0% expansion setting, gate 99 of FIG. 7 is enabled when word time counter 54 reaches a count of 15. This count is decoded by gate 69o of FIG. 5 and is applied to one input of gate 99 to effect reset of flip-flop 26. The manner of reset of flip-flop 26 by the expansion reset signal will be set forth in detail hereinbelow.

Figure 5:
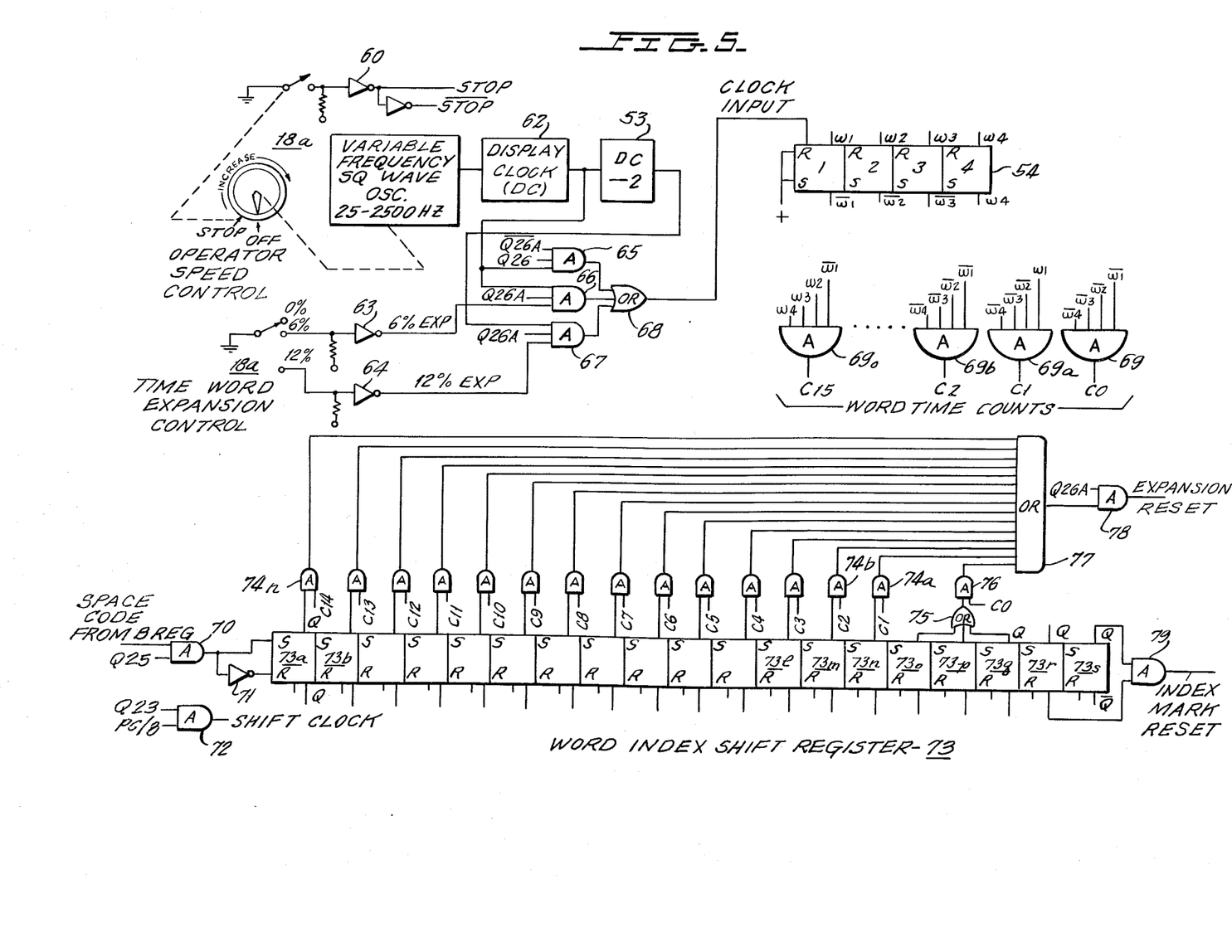
FIG. 5 is a block diagram showing the logical circuitry for controlling word expansion control time.

The 12% expansion setting causes the gating of the variable frequency oscillator 52 through divide by 2 counter 53 to be inputted to gate 67 shown in FIG. 5 so as to obtain a second count sequence of the word time count, thus doubling the time period of each count. Flip-flop 26A defines the word time expansion.

The word index shift register 73, shown in FIG. 5, is comprised of 19 stages and performs two functions which have already been referred to in the description of the word process cycle period (for setting flip-flop 25) and the word time expansion operation. The first of these functions is to determine when the current word being processed has been shifted to the index mark in the display unit. This is accomplished by entering a binary "1" bit for each space code detected in a block of information and by entering a binary "0" bit for all character bytes transferred to the word index shift register each time a space code is entered into the B register 48 (during flip-flop 23 time). In this manner, the index mark reset gate 79 samples the 18th and 19th stages of the word index register and when these stages respectively contain a binary 0 and binary 1 condition (indicating that the first character of the current word has been shifted to the display panel index mark) the output of gate 79 goes high to develop the index mark reset signal which is simultaneously applied to associated inputs of gates 97 and 98 shown in FIG. 7.

The second function performed by the word index shift register 73 is that of controlling the amount of word time expansion by comparison of successively lower word index shift register stages until one bit is sensed, thus indicating the end of the word. Thus, when a space code is shifted to the right-hand-most stage (stage 73s) of register 73 for words of less than 18 character length, another binary 1 condition representative of the next space code will have been shifted into one of the stages 73a – 73n (for words of greater than five character length) causing one of the gates 74a – 74n to be enabled, which condition is passed by OR gate 77 and AND gate 78 (during flip-flop 26A time) to develop the expansion reset signal. In this manner, the number of characters in the current word minus the first four characters (note that stages 73o – 73r are all gated together with count zero developed by gate 69 of the word time counter) are counted out providing for the time expansion count.

Figure 8:
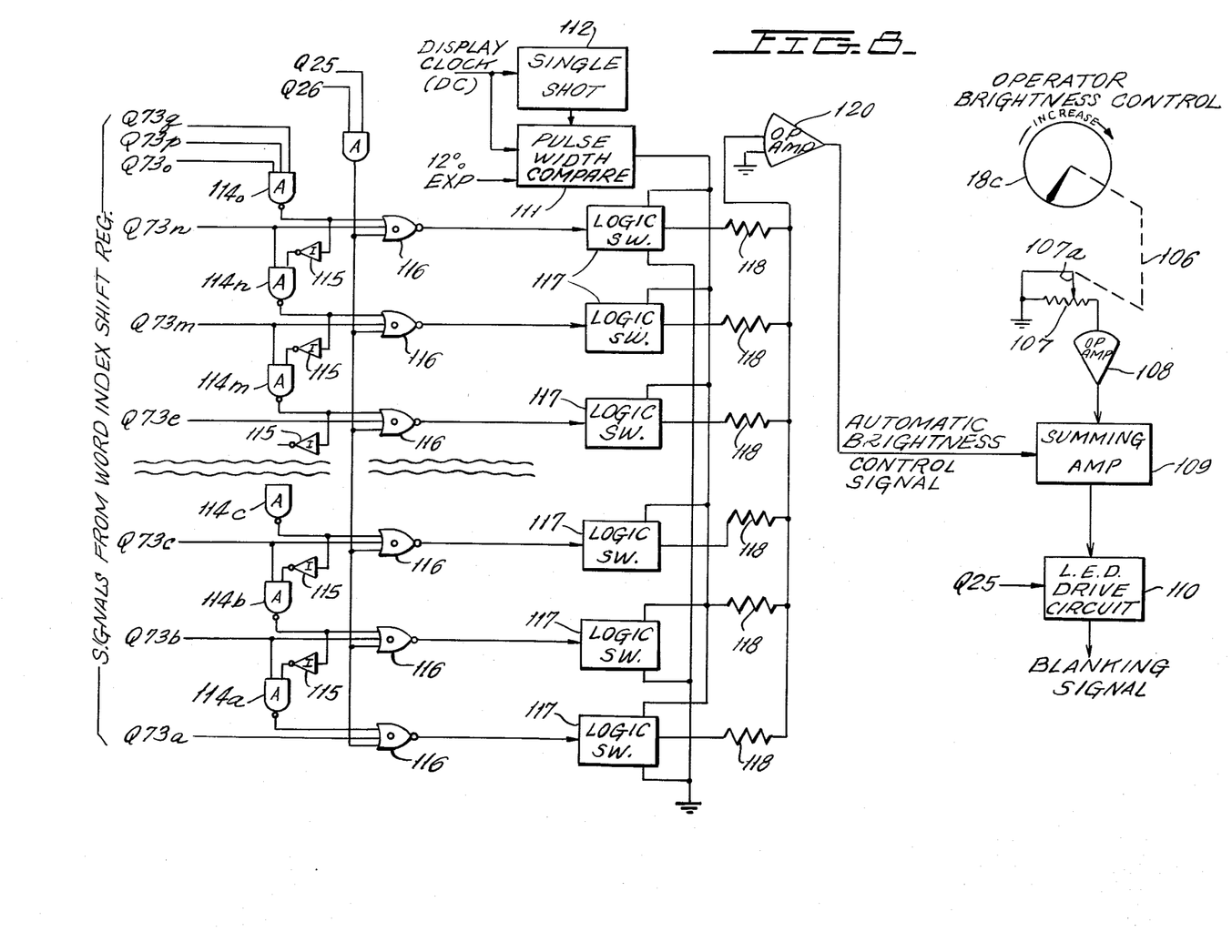
FIG. 8 is a block diagram showing a brightness control circuit.

Automatic brightness control comprises a further improvement in the operation of the display communicator and is manifested in the automatic brightness control circuit of FIG. 8 which is adapted to increase the brightness of the display when the display time period is less than 0.10 seconds. It is well known that the fovea of the eye has the property of integrating light received within a time interval of 0.10 seconds (by the Bunsen-Roscoe Law). When light patterns of constant brightness are viewed for periods of 0.10 seconds or less, the apparent brightness is made to vary as a function of the viewing time. Since the retina of the eye tends to reach a saturation level in approximately 0.10 seconds, light patterns which are viewed for periods greater than 0.10 seconds do not appear to vary in brightness as a function of time. Thus, whenever the display time interval is less than 0.10 seconds, the display brightness may be automatically increased in a linear fashion and inversely proportional to the time interval whenever less than 0.10 seconds in order to enable the eye to observe the same apparent brightness.

FIG. 8 shows the display brightness circuits wherein the basic display brightness level is determined by the operator brightness control switch 18c, which control knob may for convenience form part of the operator control panel and thereby be positioned in close proximity to the speed control and word time expansion control knobs 18a and 18b, respectively. The automatic brightness circuit functions only when the operator speed control is adjusted to a repetition rate which results in display times of 0.10 seconds or less. The automatic brightness control also compensates for display time variations resulting from use of word time expansion.

The brightness control knob 18c is mechanically interlocked, as represented by dotted line 106, with the adjustable arm 107a of potentiometer 107. The output or voltage level of potentiometer 107 is applied to one input of summing amplifier 109 by means of operational amplifier 108.

The automatic brightness circuits are comprised of a pulse width comparator 111 which compares the square wave time period generated by the operator's speed control with a fixed time period generated by one-shot multivibrator 112. When the square wave time period results in a display time of less than 0.10 seconds, pulse width comparator 111 generates a voltage which is inversely proportional to the display time. The output of the pulse width comparator 111 is fed to a multiplier-digital to analog converter (MDAC) which modifies the pulse width comparator signal if the word time expansion circuit is activated. If the word time expansion is not activated, the pulse width comparator signal is fed unmodified to the summing amplifier 109 which combines the operator brightness control signal and the pulse width comparator signal to produce the correct brightness level for viewing (i.e. the apparent constant brightness level).

If the word time expansion circuit is activated, the digital word formed by the signals appearing at the Q outputs of the stages 73a–73r of word index shift register 73 appear as the inputs to selected ones of the gates 114a–114o, which correspondingly act through the inverters 115 and the NOR gates 116 to control the MDAC 117 to reduce the brightness level in proportion to increased display time for words of more than four characters in length, and conversely increase brightness as word length reduces. For example, considering a word of two character length, gate 114o will give a high output for a word of only two character length. This state will be inverted at 115 and applied to one input of gate 114n which will develop a high output regardless of the condition appearing at input line $Q_{73n}$ which will be the case for all inputs $Q_{73n}$ through $Q_{73a}$ due to the presence of each of the inverters 115. Since the gates 116 are high only when all of their inputs are binary 0, the MDAC's will develop current signals which are passed through the weighted resistors 118 which can be seen to have increasingly greater resistance values for greater word length words. In the example given, for a word of only two character length, all of the MDAC's 117 will pass currents through their associated resistors 118 to apply an automatic brightness control signal to summing amplifier 109 through operational amplifier 120. Summing amplifier 109 develops a brightness level by summing the operator brightness control setting with the output of operational amplifier 120 to control the signal applied to the LED drive circuitry 110.

Thus, the logic gates used to connect the Q signals with the MDAC allow the MDAC to see only the highest Q signal which has a high output (binary 1 level). As a further example, if the key word in the word index shift register is a seven character word, input line $Q_{73k}$ will be binary 1 indicating a blank character or space code following the key word. If the word following the key word is two characters in length, $Q_{73h}$ will also be high. Since input line $Q_{73k}$ is the only signal which should be considered, the inverter circuits 115 serve to block the high condition at $Q_{73h}$ from reaching the MDAC.

The flip-flop circuits 25 and 26 provide a time sample gate to time the transfer of the Q signals to the MDAC.

The 12% expansion signal is also fed to the pulse width comparator to cause the output of the pulse width comparator 111 to be compensated due to the doubling of the word time expansion when a 12% expansion setting is used in place of the 6% expansion setting.

In order to provide still another alternative method for increasing comprehension time for words longer than four characters, the blank time following a longer word may be increased while the display time remains constant. This is accomplished by using the word time expansion logic of FIG. 5 while blanking the display unit during the time expansion period when flip-flop 26A is set.

It is known that the retina of the eye retains light pattern image for a period of the order of 0.20 to 0.25 seconds after a display is turned off provided that the display is not reilluminated with new information. Presentation of new information destroys the retained image. Thus, it can be seen that word comprehension may be considered to be a function of time and once the eye has received the image it is not necessary to continue to display the image.

The alternative method of increasing comprehension time provides a finite saving and logic circuits since the automatic brightness circuit may be greatly simplified by omitting the MDAC and its associated Q signal logic gates due to the fact that display time is no longer varied as a function of word time expansion. Thus, when using increased blanking time as an alternative to increased display time for long words the blanking signal flip-flop 25 would be replaced by an OR gate combining both flip-flop 25 and flip-flop 26. This will cause the display to be blank during both the set condition (Q) of flip-flop 25 (time when characters are being shifted into the display) and the set condition (Q) for flip-flop 26 (the variable blanking period immediately following the display period). In this manner flip-flop 26 will provide the increased blanking time in the same way that it provided the increased display time for long words (see FIG. 4 for the Blanking Signal input to the display LED's).

It can be seen from the foregoing description that the present invention provides a novel, portable and in fact, hand-held display communicator providing a means of presenting text information in single line fashion at an operator selectable rate to provide apparatus for actively encouraging and influencing improvements in reading time and comprehension. The presentation of text information in a single line format removes unnecessary distractions from the observer to further enhance reading rate and reading comprehension.

Illumination of displayed words upon arrival at the index mark serves to reduce eye fatigue and the techniques for varying the word display time, brightness control and/or blanking time as a function of word length provide additional and significant features which all contribute to both reading rate and reading comprehension.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A portable hand-held device for displaying textual material in a single line position comprising:
   removable first storage means for storing binary coded data representative of textual information;
   said device having means for receiving said first storage means;
   a first memory adapted to store a predetermined block of textual information in binary form;
   reader means being selectively actuated for transferring a block of data from said first storage means to said first memory;
   logic means responsive to the presence of each end of block code interspersed in said first storage means to deactivate said reader means;
   second memory means for storing a block of textual information in binary form;
   transfer means for transferring the contents of said first memory to said second memory responsive to the sensing of an end of block code by said logic means;
   second means responsive to the transfer of an end of block code into said second memory means for deactivating said transfer means;
   a multi-bit register means;
   means responsive to completion of the transfer of data into said second memory means for transferring binary coded words into said register means in sequential fashion;
   character generator means for converting the binary coded word in said register means into an M × N dot matrix pattern comprised of M dot columns of N dots per column, wherein each pattern forms a character associated with a predetermined binary code;
   display means comprising a dot matrix of a P × N dot matrix of light emitting devices comprised of P columns of N dots per column, where P = K(M+2) and K is a real integer greater than 1;
   N shift register means each associated with a row of said P × N matrix of light emitting devices;
   means for transferring each dot column pattern generated by said character generator means into the input stages of said N shift registers in a sequential dot column by dot column fashion;

means responsive to the word length of at least one of the words loaded into said N shift registers for controlling the interval of time during which the said last word is illuminated.

2. A portable hand-held device for displaying textual material in a single line position comprising:

removable first storage means for storing binary coded data representative of textual information;

said device having means for receiving said first storage means;

a first memory adapted to store a predetermined block of textual information in binary form;

reader means being selectively actuated for transferring a block of data from said first storage means to said first memory;

logic means responsive to the presence of each end of block code interspersed in said first storage means to deactivate said reader means;

second memory means for storing a block of textual information in binary form;

transfer means for transferring the contents of said first memory to said second memory responsive to the sensing of an end of block code by said logic means;

second means responsive to the transfer of an end of block code into said second memory means for deactivating said transfer means;

a multi-bit register means;

means responsive to completion of the transfer of data into said second memory means for transferring binary coded words into said register means in sequential fashion;

character generator means for converting the binary coded word in said register means into an M × N dot matrix pattern comprised of M dot columns of N dots per column, wherein each pattern forms a character associated with a predetermined binary code;

display means comprising a dot matrix of a P × N dot matrix of light emitting devices comprised of P columns of N dot per column, where P = K(M+2) and K is a real integer greater than 1;

N shift register means each associated with a row of said P × N matrix of light emitting devices;

means for transferring each dot column pattern generated by said character generator means into the input stages of said N shift registers in a sequential dot column by dot column fashion;

means responsive to the word length of at least one of the words transferred into said display means for blanking the display for a time interval which varies directly with the word length of said word.

3. A portable hand-held device for displaying textual material in a single line position comprising:

removable first storage means for storing binary coded data representative of textual information;

said device having means for receiving said first storage means;

a first memory adapted to store a predetermined block of textual information in binary form;

reader means being selectively actuated for transferring a block of data from said first storage means to said first memory;

logic means responsive to the presence of each end of block code interspersed in said first storage means to deactivate said reader means;

second memory means for storing a block of textual information in binary form;

transfer means for transferring the contents of said first memory to said second memory responsive to the sensing of an end of block code by said logic means;

second means responsive to the transfer of an end of block code into said second memory means for deactivating said transfer means;

a multi-bit register means;

means responsive to completion of the transfer of data into said second memory means for transferring binary coded words into said register means in sequential fashion;

character generator means for converting the binary coded word in said register means into an M × N dot matrix pattern comprised of M dot columns of N dots per column, wherein each pattern forms a character associated with a predetermined binary code;

display means comprising a dot matrix of a P × N matrix of light emitting devices comprised of P columns of N dots per column, where P = K(M+2) and K is a real integer greater than 1;

N shift register means each associated with a row of said P × N matrix light emitting devices;

means for transferring each dot column pattern generated by said character generator means into the input stages of said N shift registers in a sequential dot column by dot column fashion;

means responsive to the word length of at least one of the words loaded into said display means for increasing the brightness level of the display light emitting devices inversely proportional to the length of the word.

4. The apparatus of claim 1 wherein said display means is provided with an index mark at a point intermediate the left and right-hand ends of the display light emitting devices;

means responsive to shifting of the first character of a word into the positions of the N-registers associated with said index mark for activating said display means.

* * * * *